United States Patent [19]

Mayer et al.

[11] 4,039,294
[45] Aug. 2, 1977

[54] FILTER FOR INTERNAL COMBUSTION EXHAUST GASES

[76] Inventors: Edward A. Mayer; John T. Brandenburg; John M. Crone, Jr.; Charles A. Ropes, Jr., all of Texaco Inc. P.O. Box 509, Beacon, N.Y. 12508

[21] Appl. No.: 579,513

[22] Filed: May 21, 1975

[51] Int. Cl.² .................... B01J 8/02; F01N 3/15
[52] U.S. Cl. .................... 23/288 FB; 55/DIG. 30
[58] Field of Search ........ 23/288 F, 288 FA, 288 FB, 23/288 FC; 55/DIG. 30; 60/299

[56] References Cited

U.S. PATENT DOCUMENTS

| | | | |
|---|---|---|---|
| 2,288,943 | 7/1942 | Eastman | 23/288 FB |
| 3,061,416 | 10/1962 | Kazokas | 23/288 F |
| 3,495,950 | 2/1970 | Barber et al. | 23/288 FB |
| 3,503,716 | 3/1970 | Berger | 23/288 FB |
| 3,773,894 | 11/1973 | Bernstein et al. | 23/288 FB X |
| 3,780,772 | 12/1973 | Carnanhan et al. | 23/288 FC UX |
| 3,857,680 | 12/1974 | Porta et al. | 23/288 F X |

Primary Examiner—Joseph Scovronek
Attorney, Agent, or Firm—Thomas H. Whaley; Carl G. Ries; Robert B. Burns

[57] ABSTRACT

A smoke filter adapted to receive a stream of hot engine exhaust gas and to remove particulate carbon particles therefrom. The hot exhaust gas stream is passed progressively across catalytic beds which are spaced slightly apart within a closed casing. Each catalytic bed is mounted to an individual support member which is in turn cross braced with tension elements to protect the catalyst material from damage due to shock loading and high localized temperatures experienced within the catalyst bed.

4 Claims, 6 Drawing Figures

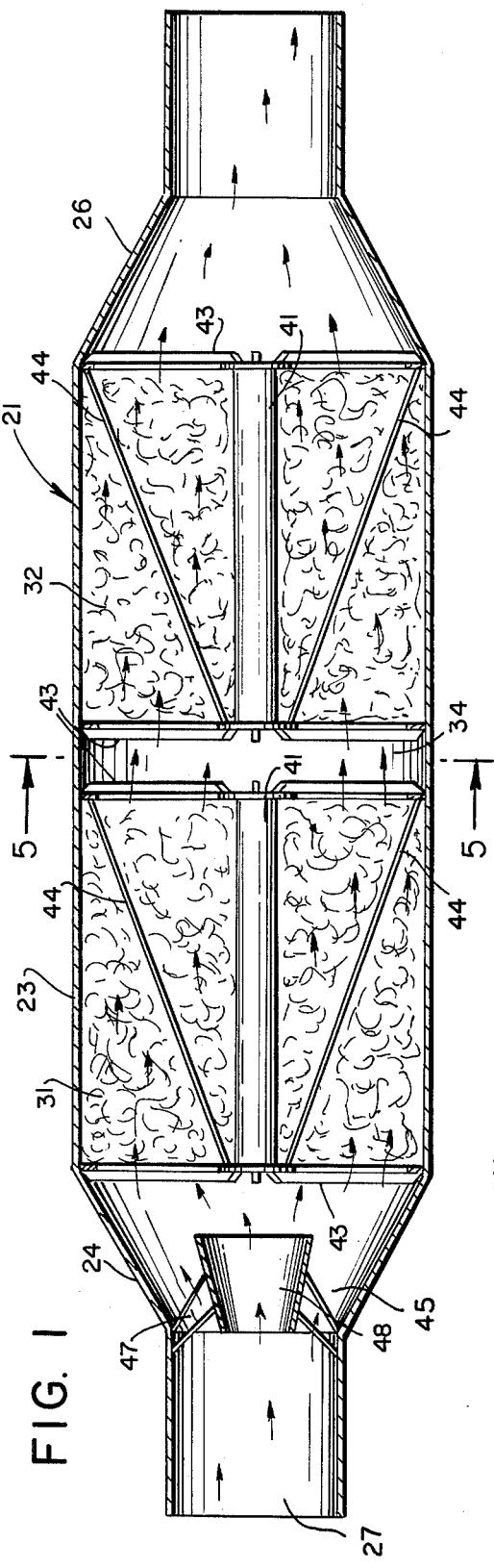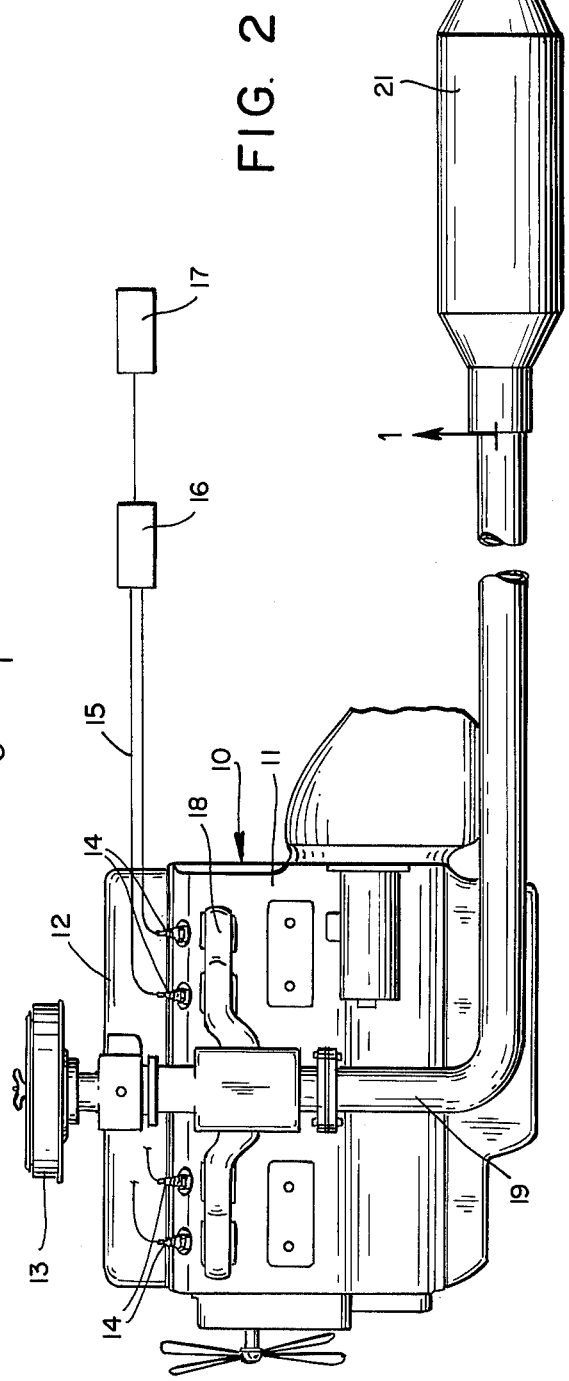

4,039,294

FILTER FOR INTERNAL COMBUSTION EXHAUST GASES

BACKGROUND OF THE INVENTION

In conjunction with the operation of any internal combustion engines various forms of exhaust gas treating apparatus are known and used having the general purpose of protecting the atmosphere and the environment. One form of such treating apparatus includes a catalytic converter or treating unit wherein hot exhaust gases are received, and harmful components are reduced in quantity by oxidation, or eliminated through chemical reaction. Thus, as treated exhaust gas leaves the filter or the converter, the gas is relatively harmless. Further, it is free of solid particles, and can be safely discharged into the atmosphere without fear of polluting or damaging the latter to any extent.

Such catalytic converters or filters are normally so positioned with respect to the engine as to receive the exhaust gases in as hot a condition as possible. Thus, the catalyst is rapidly raised to, and remains at this elevated operating temperature. Further, the unit is normally subjected to considerable physical abuse. This is particularly true in the instance of an automotive or similar motor vehicle wherein vibration and severe movements act adversely upon the filter.

Ordinarily, when the internal combustion engine is at rest, the catalytic filter will be at substantially atmospheric temperature. However, upon being started, the engine will discharge a relatively hot exhaust gas which, within a short period of time, can climb to a temperature of 700° to 1100° F. In addition, prolonged exposure to such high temperatures can physically weaken the structure. It is appreciated that the combustion of such wide temperature differentials and continuous high temperatures acting upon the filter, will be detrimental to both the filter's structure and the operation thereof.

It has been found that under severe circumstances of temperature, as well as engine and vehicle vibration, the catalyst bed can sustain gradual damage by a separation of the catalytic material from the carrier or substrate. Further, such vibration can cause the filter material to become spaced from the filter casing walls thereby permitting at least part of the exhaust gases to channel past the catalyst bed. Continued use over a period of time will widen said channels. Said bypass gas will subsequently increase in volume and be discharged to the atmosphere in an untreated condition.

A further detriment experienced in such smoke filters resides in the excessive back pressure encountered. This results from excessive accumulations on the catalyst surfaces. Such a circumstance will tend to inhibit proper functioning of the filter to its maximum capacity, and will lessen the efficiency of the engine on which it is used.

Toward overcoming these above noted difficulties, the present arrangement includes in essence a catalytic converter or smoke filter particularly adapted for treating and for removing harmful particles such as carbon and the like from an exhaust gas stream. This is achieved by passing the latter through a series of braced and supported, yet separated catalytic beds that chemical reactions within the latter dispose of the carbon thereby resulting in a relatively clean residual gas.

An object of the invention then is to provide a compact, relatively rugged filter unit capable of cooperating with an internal combustion engine to treat exhaust gases leaving the latter. A further object is to provide means for minimizing the thermal and physical shock on the catalyst material normally caused during the operation of an internal combustion engine under certain circumstances of engine load. A still further objective is to provide an exhaust gas treatment unit having a series of catalyst beds disposed therein, capable of withstanding sustained physical vibrations of shock as well as severe temperature gradients. Another object is to provide a filter structure which is capable of minimizing filter back pressure during operation thereof.

DESCRIPTION OF THE DRAWINGS

FIG. 1 is an elevation view in cross section of the present smoke filter and also a view taken along line 1—1 of FIG. 2.

FIG. 2 is an assembly view of the filter attached to an engine.

Figure 5:
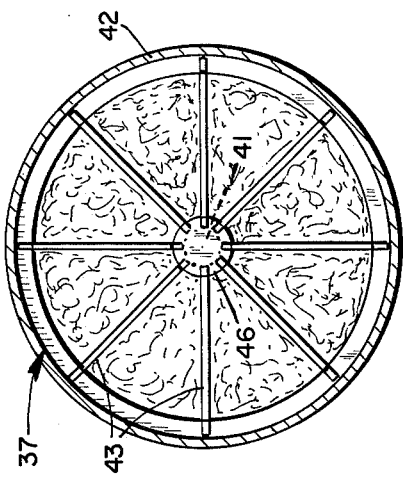
FIG. 5 is a sectional view taken along line 5—5 in FIG. 1.

Referring to the drawings, an internal combustion engine of the type to which the present filter is adapted need be of no special form. The engine here illustrated in FIG. 2 is operable on a fuel-air charge which is introduced to engine cylinders by either a carburetor system or a direct fuel injection system.

Referring to FIG. 2, internal combustion engine 10 includes the normal multi-cylinder block 11 embodying a plurality of reciprocally mounted pistons. Inlet manifold 12 is connected to an air filter 13 or similar means adapted to receive atmospheric air. The latter is directed to the respective pistons' combustion chambers for periodic introduction thereto during the piston intake stroke.

Each engine cylinder is provided with a fuel injector 14 connected by a line 15 to a pump 16, which is communicated with a source of fuel 17. Operationally, depending upon engine speed and load conditions, the amount of fuel injected into a combustion chamber on each cycle, is varied while the volume of air drawn in is maintained substantially constant.

On the cylinder exhaust stroke, hot exhaust gases resulting from the combustion process are discharged into an exhaust manifold 18 which in turn is communicated through conduit 19 with the present catalytic converter or smoke filter 21. As above mentioned, the physical spacing between the exhaust manifold 18 and inlet to the catalytic filter 21 is preferably minimized. The connecting means can also be insulated to maintain the temperature of the exhaust stream. The latter facilitates the operation of the converter by raising it to its necessary functioning level as quickly as possible.

Under normal operation, the engine charge will be adjusted for varying load and speed conditions. Thus, the characteristics and the constituents of the produced exhaust gas will likewise vary.

With respect to the instant arrangement, under certain engine loads, a considerable amount of smoke will be present in the exhaust gas. This smoke, in the instance of the combustion of a hydrocarbon fuel, consists of minute particles of unburned carbon. These, when carried on a gaseous stream from the exhaust pipe, reduce the opacity of the gases. This smoky exhaust stream according to the invention, is introduced to the inlet 27 of filter 21 to be treated, and is subsequently discharged to the atmosphere through exhaust pipe 22.

Referring to FIGS. 1 and 2, the instant smoke filter 21 comprises in essence an elongated metallic casing 23 preferably cylindrical in cross sectioned configuration. The casing, however, can assume a general ellipsoidal cross sectional configuration depending on the position of the unit within, or adjacent to the vehicle. Casing 23 is normally formed of structured sheet metal with welded seams. Both the metal and seams are capable of withstanding the high temperatures experienced during the gas treating period. Further, it must function even though subjected to such external conditions as being exposed to splashing water, snow, and the like.

Each end of casing 23 is provided with a frusto conical end wall 24 and 26, respectively. The spaced apart end walls are preferably welded in place to the casing remote edges. However, any joint capable of maintaining gas tight integrity of the unit is satisfactory for establishing the filter's substantially closed interior.

The inlet end wall 24 of the filter 21 is provided with frusto conical section to define a tapering portion which forms a divergent flow passage between the casing body 23 and exhaust gas inlet opening 27. The latter is so shaped, and provided with suitable connections such as a flange or the like, to be removably connected into the engine exhaust gas system by way of conduit 19.

The casing 23 discharge end wall 26 is formed much in the manner of the inlet end 24. Specifically, said exhaust end wall 26 includes a converging section which gradually reduces the gas passage from the casing 23 diameter, to the diameter of the exhaust pipe 22.

The interior of casing 23 includes an inner wall which defines an elongated gas passage or compartment. The latter is provided with a catalytic material positioned transversely of said passage. Said material is disposed in a manner to contact all the hot exhaust gas passing therethrough. In the present preferred arrangement, a plurality of catalytic beds 31 and 32 are shown. These are sequentially or serially arranged within the filter gas passage, the respective catalytic bed adjacent faces being spaced apart one from the other. Such space is formed by transverse openings 34, being of a sufficient width to permit free circulation of exhaust gas therein as it passes from one bed to the next.

In the instance of each bed 31 and 32, the outer diameter thereof is such that the periphery of the catalytic material lies contiguous with the inner surface or wall of casing 23. This arrangement forms a path in the casing through which all the exhaust gas streams must pass, thus assuring contact with a portion of the catalytic surface.

Figure 3:
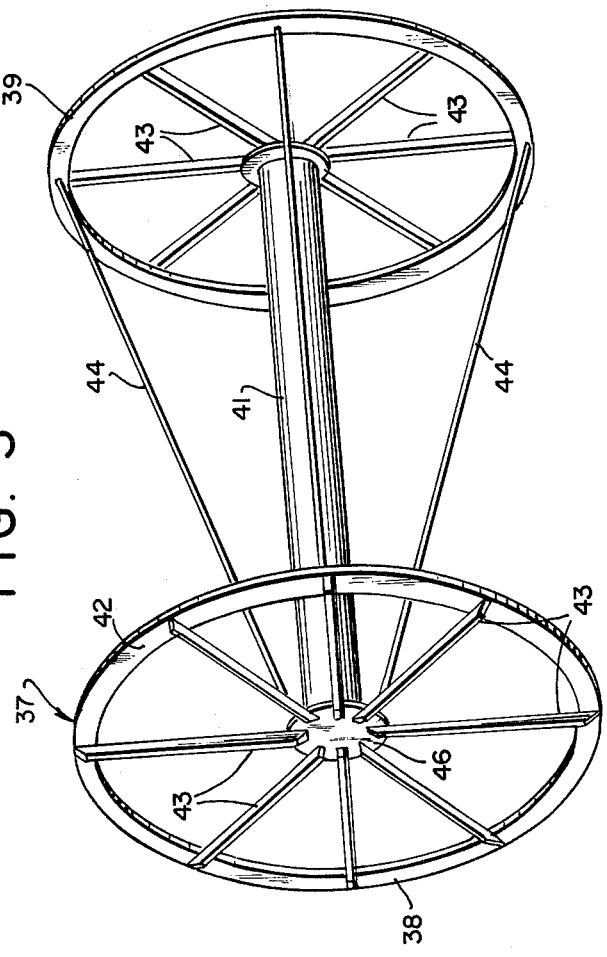
FIG. 3 is a segmentary view of a catalyst support unit.
Figure 4:
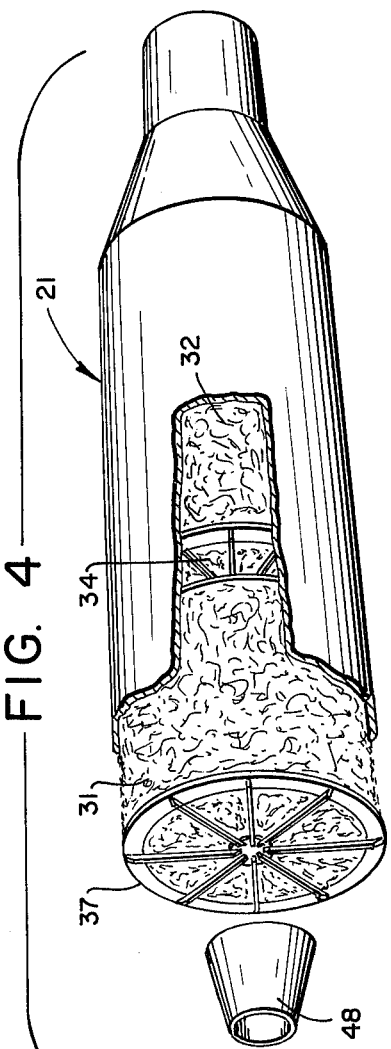
FIG. 4 is an elevation view with a part of the casing removed, of the filter shown in FIG. 1.

Referring to FIG. 3, to facilitate handling and preservation of the catalyst unit 31, the latter includes a reel-like carrier member 37. Said member supports the catalyst in a way to minimize the chances of its collapsing under the heat and vibrational stresses. Each catalyst carrier member 37 includes spaced apart end panels 38 and 39 which are fastened to a central core member 41.

Each end panel, 38 for example, comprises a circular metallic ring 42 having a diameter slightly less than the inside diameter of the casing 23. This arrangement facilitates the sliding of, positioning, and fastening of the catalyst unit 31 into the casing 23 gas passage.

Each end member 38 is further provided with a plurality of radially disposed fins 43, being preferably spaced substantially uniformly about the core member 41 and radiating outward to the ring 42. Said fins 43 are fastened preferably by welding or similar means to both ring 42 and core cap 46. A comparable structure at the remote end of the carrier 37 defines in effect a central core member 41, upon which catalyst is wound or packed to a desired height. The ends of the catalyst bed or mass are retained within the space between the respective end panels 38 and 39. Said panels are so constructed to facilitate the free passage of hot gas therethrough with as little resistance as possible.

While any number of catalytic materials will serve satisfactorily in the instant function of eliminating smoke from the exhaust gas, the present catalytic composition is found to be desirable. Said composition comprises a thin substrate or carrier member formed of shredded stainless steel, upon which an alumina coating has been deposited. The latter includes a catalytic element such as "copper chromite".

Normally the overall catalytic material is provided as noted in the form of elongated metal strips which are randomly packed to form a perforate bed, and yet assure contact between a catalytic surface and the passing hot exhaust gas. In the shown arrangement, thin elongated randomly oriented catalyst strips are wound upon the carrier core 41 in a sufficient amount, and with sufficient density to assure the above noted operating conditions.

Subsequent to the catalyst being placed onto carrier member 37 either by winding or other appropriate form of deposition, the unit is ready for assembly within casing 23.

Within the latter, as each catalyst unit 31 and 32 is fixed into place, intermediate space or transverse opening 34 is maintained between adjacently disposed beds. This spacing is preferably maintained regardless of the number of catalyst beds which are employed.

To assure the integrity of the catalyst bed under the most arduous conditions of temperature gradients and physical vibration, the bed itself is internally reinforced. The latter is achieved by use of a plurality of support or tension members 44 which extend between the two ends of the catalyst bed. These members 44 are initially placed under tension to assure their effectiveness even at the herein noted usual elevated operating temperatures which would tend to elongate the members.

In the present arrangement shown, supporting members 44 include a plurality of relatively thin non-rigid wire elements which are anchored at ring 42, and at the core piece end 46. While the support element unit preferably embodies a non-rigid heavy wire, it also can assume a rigid, rod-like disposition, also pretensioned. It is appreciated that a sufficient number of said reinforcing or support members 44 are disposed throughout the catalyst bed 32 to effectively achieve the desired objective of bracing the relatively fragile bed 32 while minimizing the latter's resistance to gas flow.

In the present instance eight such reinforcing units 44 are disposed within bed 32. Further, they are spaced peripherally about and through the catalyst bed, extending diagonally from ring 39 to the opposite core closure piece 46. While the present tension members 44 are shown extending longitudinally, although not necessarily parallel with the axis of core 41, they can also be arranged and fastened to form a desired angle with a plane disposed normal to the core 41 longitudinal axis.

To further minimize filter back pressure to gas flow, and to achieve the optimum gas volume, a diffuser 48 is positioned within casing 23 at a point upstream of the initial catalyst bed 31. Said diffuser 48 includes a frusto conical-like member having walls which define a central divergent passage 50. The latter includes an inlet opening 49 arranged in substantial alignment with inlet opening 27. A plurality of ribs 54 radiate outwardly from the diffuser 48, being fixed to adjacent walls 24 whereby to fixedly locate the diffuser.

Opening 49 is preferably substantially smaller than opening 27 thereby being in a position to divide the entering gas stream into two segments. Thus, the exhaust gas stream will be directed through the diffuser inner passage 50 to most evenly impinge against the formed face of bed 31. Also the outer gas stream segment will be guided through annulus 45 toward the outer edge of catalyst bed 31.

Figure 6:
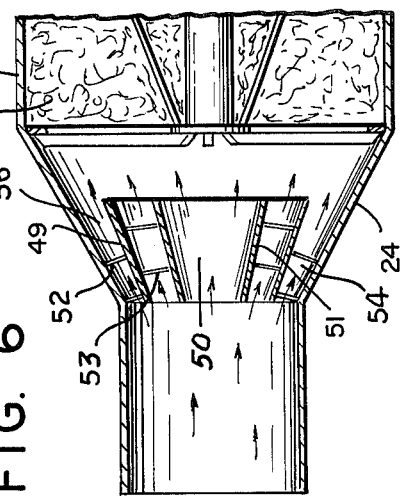
FIG. 6 is a segmentary sectional view of an alternate embodiment of the filter inlet end.

In an alternate embodiment, as shown in FIG. 6, diffuser 48 can embody a plurality of frusto conical members 49 and 51 so arranged concentrically to define a plurality of annular divergent passages 54 and 56. Peripherally arranged ribs 52 and 53 position the corresponding diffuser in substantial alignment with the gas inlet passage to assure good distribution of the overall gas flow against the face of catalyst bed 31.

Other modifications and variations of the invention as hereinbefore set forth may be made without departing from the spirit and scope thereof, and therefore, only such limitations should be imposed as are indicated in the appended claims.

We claim:

1. A catalytic filter for cleaning a high temperature exhaust gas stream discharged from an internal combustion engine as a result of the combustion of a hydrocarbon fuel and air mixture, which catalytic filter includes an elongated closed casing having opposed end walls, inlet and outlet means disposed at the respective opposed end walls, and casing side walls which define a longitudinal gas passage therethrough communicating the respective inlet and outlet means, a plurality of discrete gas permeable catalytic beds disposed in longitudinally spaced relationship within said longitudinal passage to contact said stream of hot exhaust gas which passes therethrough, each of said discrete gas permeable catalyst beds including;

a central core member having opposed core ends, and end panels carried on the respective core ends, said end panels including an outer ring adapted to be slidably inserted within said casing, and radially positioned fins extending between a core end and the outer ring adjacent thereto, support tension members extending between, and fixed to, an outer ring and the opposite core end, and a catalytic material disposed intermediate said respective end panels and surrounding said support tension members and supported by the latter, said support tension members including a plurality of discrete elements, spaced equidistant apart about said outer ring and said core end respectively, to define a conical pattern.

2. In the apparatus as defined in claim 1, wherein said support tension members include a plurality of flexible wires.

3. In the apparatus as defined in claim 1, wherein said support tension members include a plurality of rigid elements.

4. In the apparatus as defined in claim 1, wherein said closed casing includes a plurality of coaxially aligned frusto conical members positioned concentrically one within the other to define a plurality of annular outwardly divergent passages between adjacent walls thereof for dispersing said exhaust gas toward the catalyst bed.

* * * * *